T. YATES.
Harvesters.

No. 143,110. Patented September 23, 1873.

Witnesses.
Harry King.
W. W. Dodge.

Inventor:
Theo Yates
By Dodge & Son
Attys

UNITED STATES PATENT OFFICE.

THEODORE YATES, OF MILWAUKEE, WISCONSIN.

IMPROVEMENT IN HARVESTERS.

Specification forming part of Letters Patent No. 143,110, dated September 23, 1873; application filed December 6, 1872.

*To all whom it may concern:*

Be it known that I, THEODORE YATES, of Milwaukee, in the county of Milwaukee and State of Wisconsin, have invented certain Improvements in Reaping-Machines, of which the following is a specification:

My invention consists in a reciprocating rake of novel construction, and in mounting one end of the reel-shaft in a swiveled bearing, so that when the reel is not in use it may be swung around out of the way.

Figure 1:
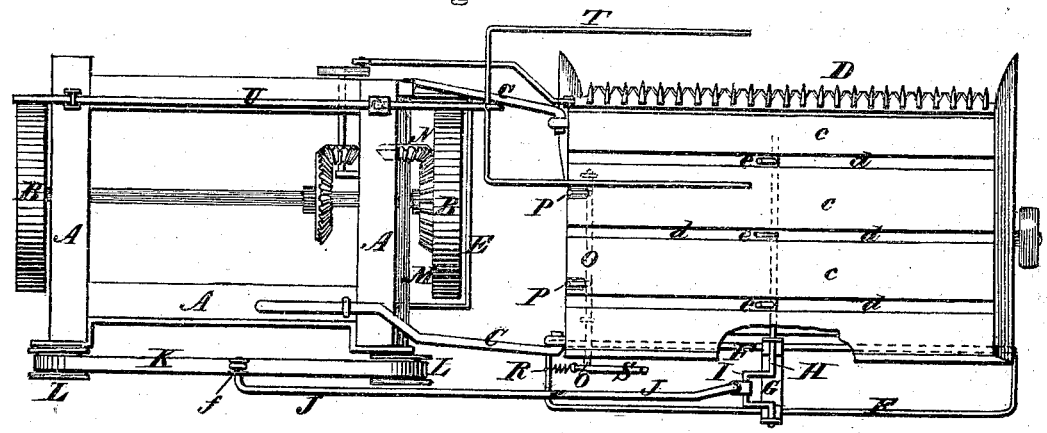
Figure 2:
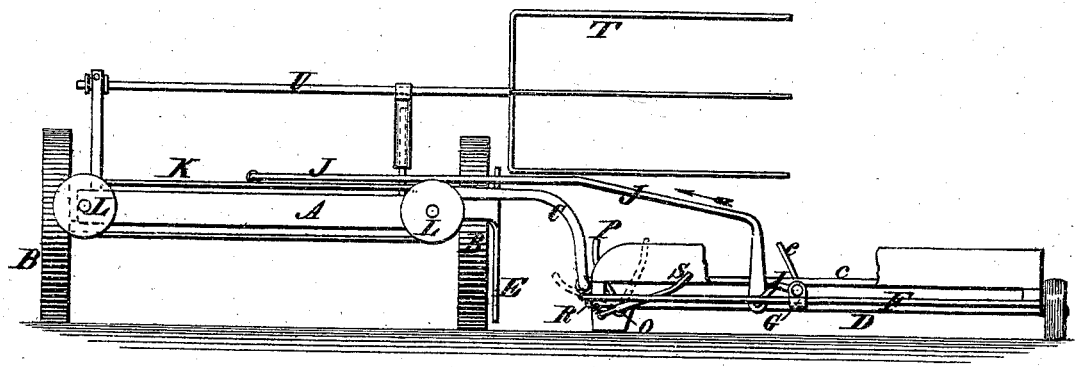
Figure 3:
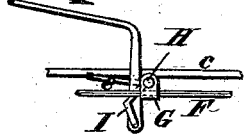

Figure 1 is a top-plan view of a machine having my improvements embodied therein. Fig. 2 is a rear elevation of the same, and Fig. 3 is a detail view of the rake-head.

A is the rigid rectangular frame, mounted upon two wheels, B, and provided at each of its inner corners with a rigid arm, C. The platform D is made of a flat rectangular form, and hinged at its inner end to the ends of the two arms C, in such manner that its outer end can rise and fall freely in conformity with the undulations of the ground, and that when desired it can be turned up in a vertical position. The arms hold the platform opposite the side of the frame, but at such distance therefrom that the grain may be delivered from the inner end of the platform between said end and the inner wheel of the machine. In order that the rear arm may not strike and scatter the grain as it is delivered, the arm is curved upward, as shown in Fig. 2, and in order to prevent the grain from falling under or catching in the inner wheel B, a guard-plate or shield, E, is secured to the frame in such manner as to cover the outside of the wheel, as shown in Figs. 1 and 2. Lengthwise above the platform there are secured a number of parallel bars or slats, c, in such manner that narrow slits or openings d are left between their edges, and a small space left between them and the face of the platform, as shown in Figs. 1 and 2. Along the rear side of the platform there are secured two parallel guide-bars, F, upon which there is mounted a sliding head-block, G, which carries a rock-shaft, H. The shaft H extends transversely under the slats c, and is provided with teeth e, which extend up into the slits d, as shown in Figs. 1 and 2, so that when the head-block is moved to and fro on the guide-bars it will carry the rock-shaft back and forth under the slats from one end of the platform to the other, and thereby carry the fingers back and forth in the slits d. The outer end of the rock-shaft, or, as it may be termed, the rake-head H, is provided with a crank, I, to which there is connected a pitman, J, which serves to move the head-block and its connections on the guides. This pitman has its opposite end pivoted to an eye-piece, f, on a belt, K, which latter is mounted upon two pulleys, L, one at each of the rear corners of the machine. The belt is driven by one of the pulleys, which is mounted upon the end of a shaft, M, provided with a pinion, N, gearing into teeth on the inner driving-wheel; but it may be driven by any other suitable arrangement of mechanism. When the belt is set in motion the eye-piece is of course carried along in one direction, then around the pulley and back in the opposite direction, so that it gives a reciprocating movement to the pitman, and causes the latter to move the head-block back and forth, as hereinbefore described. The crank I of the rock-shaft or rake-head is so arranged that as the pitman draws the head-block toward the inner end of the platform it turns and holds the shaft so that the teeth project above the slats, as shown in Fig. 2, so that they carry the grain toward the inner end of the platform. When, however, the pitman changes the direction of its movement, and pushes the head-block outward, it turns the crank so as to throw the teeth down below the top of the slats, so that they do not take hold of the grain. Thus it will be seen that as the teeth move toward the outer end of the platform they are turned down so as not to disturb the grain, and that as they move toward the inner end of the platform they are turned up so as to carry the grain before them and off over the said end of the platform. In order to retain the grain while the rake-teeth are moving forward across the platform, so as to form it into bundles, there is mounted at the inner end of the platform a rock-shaft, O, provided with upright teeth P. A spring, R, is connected to the outer end of the shaft in such manner as to keep the teeth turned up. The end of the shaft is also provided with an arm or lever, S, so arranged that when the rake has nearly completed its forward movement, and has compressed the grain into a bundle against the teeth, the head-block will strike the arm and turn the teeth P down so as to allow the grain to pass off. As the rake again passes outward the teeth again turn up and remain in position until the rake again advances and forms another bundle. In this way the grain is automatically gathered into bundles and delivered from the machine in regular and compact order. The reel T is supported from one end only by its shaft U, which is mounted in two standards on the front of the frame, as shown.

In order that the reel may be turned around out of the way when the platform is to be turned up, the inner box or bearing is pivoted upon its standard, so that it can turn thereon, and the outer box or bearing is so constructed that the end of the shaft may be readily removed therefrom. After the outer end of the shaft has been detached the shaft may be swung around horizontally, and the reel carried around out of the way.

The outer box may be constructed in any suitable manner that will permit the ready insertion and removal of the shaft. In the present instance the box is simply left open at the top and the shaft held down therein by means of a transverse key or pin.

Suitable devices may be employed for holding the reel when swung back, in order to prevent it from swinging about.

The reel-shaft may be arranged to slide endwise in the pivoted box, so that after being turned around end for end it may be moved endwise and mounted in the two boxes with the reel over the outside of the machine.

It is obvious that in constructing the machine there are many little details which will be necessary, but which are common mechanical expedients, and need not, therefore, be shown—such, for example, as devices for throwing the rake out of gear, and similar devices.

Having described my invention, what I claim is—

1. The main frame A, having the endless belt, with its driving mechanism mounted thereon, in combination with the slotted platform provided with the reciprocating tilting rake, the latter being connected to the belt K by the crank I and pitman J, all being constructed and arranged to operate substantially as described.

2. The reel-shaft having one end mounted in a pivoted bearing, and the opposite end detachable from its bearing, substantially as shown and described, in order that the reel may be swung around horizontally.

THEODORE YATES.

Witnesses:
  JOHN R. RIESS,
  JAMES G. FLANDERS.